March 16, 1926.  1,577,402

J. M. WRAY ET AL

TRACTOR HITCH

Filed March 20, 1925    2 Sheets-Sheet 1

J. M. Wray,
V. P. Wray,
INVENTOR

BY Victor J. Evans
ATTORNEY

WITNESS:

March 16, 1926.  
J. M. WRAY ET AL  
TRACTOR HITCH  
Filed March 20, 1925  
1,577,402  
2 Sheets-Sheet 2
Fig. 3.
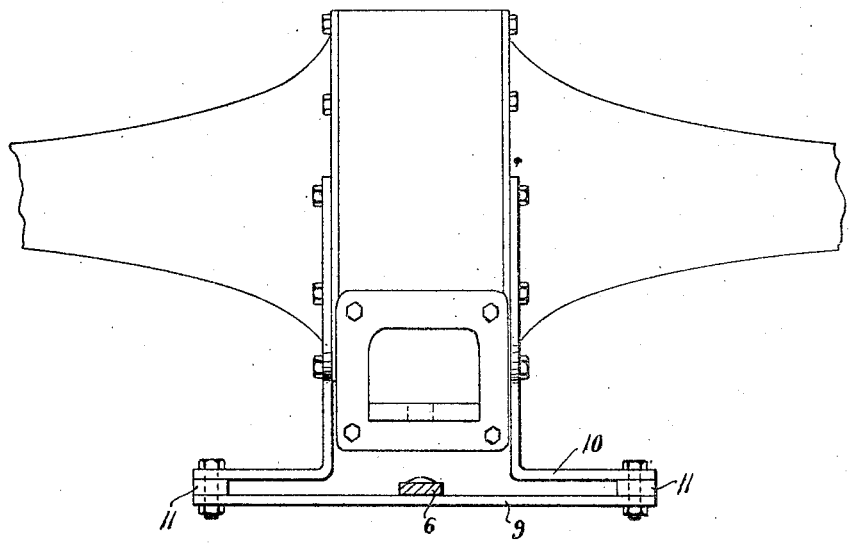
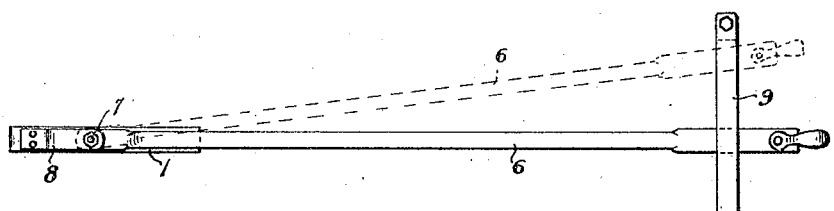
Fig. 4.

Patented Mar. 16, 1926.

1,577,402

UNITED STATES PATENT OFFICE.

JAMES M. WRAY AND VINTON P. WRAY, OF YAKIMA, WASHINGTON.

TRACTOR HITCH.

Application filed March 20, 1925. Serial No. 17,036.

*To all whom it may concern:*

Be it known that we, JAMES M. WRAY and VINTON P. WRAY, citizens of the United States, residing at Yakima, in the county of Yakima and State of Washington, have invented new and useful Improvements in Tractor Hitches, of which the following is a specification.

This invention relates to a hitch for tractors, the general object of the invention being to provide an auxiliary hitch which will permit the tractor to make short turns and which will prevent it from rising up in front when pulling heavy loads.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:—

Figure 3 is a fragmentary rear view showing the rear support for the hitch.

Figure 4 is a bottom view of the parts of the improved device.

Figure 1:
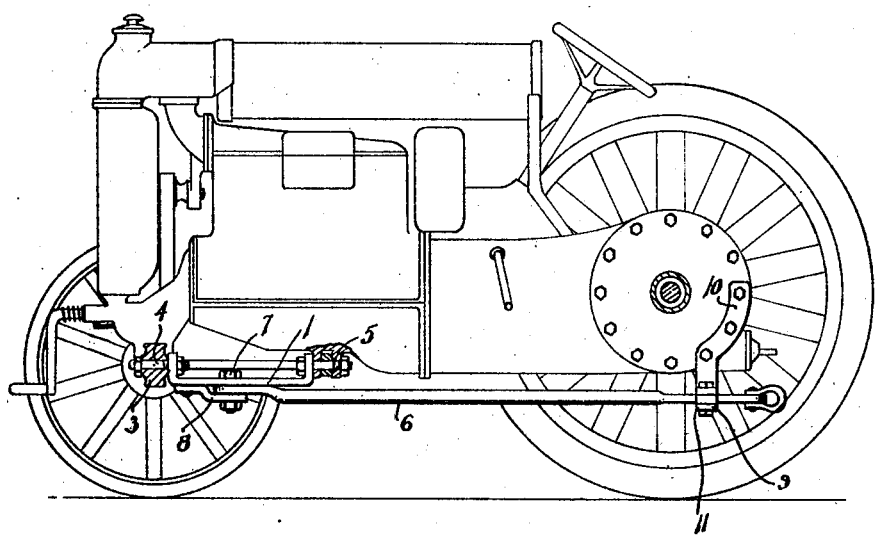
Figure 1 is an elevation, partly in section, showing the invention in use.
Figure 2:
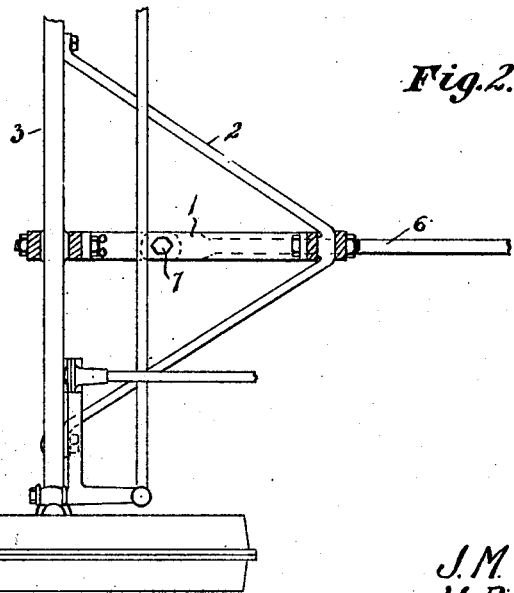
Figure 2 is a fragmentary plan view showing the means for attaching the improvement to the front part of the tractor.

In these views, 1 indicates a bracket which is placed within the space defined by the radius rod 2 of the tractor and the front axle 3 thereof. The upturned ends of this bracket are perforated to receive the bolt 4 which pivots the front axle to the front casting of the tractor and the bolt 5 which connects the rear end of the radius rod to the depending ears on the crank case. The draw bar 6 of the improvement is pivoted to this bracket by the bolt 7, a brace plate 8 being fastened to the bracket and receiving the lower end of the bolt. The draw bar 6 passes under the body of the tractor and is slidingly supported at its rear end by means of the cross piece 9 which is bolted to the angle bars 10, the curved upper ends of these bars being held to the differential housing by some of the bolts of said housing. Washers 11 are placed between the cross piece 9 and the bars 10 to space the cross piece from the bars.

From the foregoing, it will be seen that the draw bar 6 is swingingly supported about a vertical axis, at its front end and its rear end is slidingly supported by the cross piece 9. The pull is at the front of the tractor, so that the tractor cannot rise up in front and it can turn in a smaller circle. The tractor will not interfere with the regular hitch. There are no holes to bore which might weaken parts of the tractor and the device can be installed very quickly.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

In a tractor, a bracket having its ends supported by the front axle pivot bolt and the bolt for the rear end of the radius rod, a draw bar, a pivot pin carried by the bracket and passing through the front end of the draw bar, dependent bars connected to the differential housing by some of the bolts of said housing, a cross piece connected with said bars and upon which the rear end of the draw bar is slidably supported.

In testimony whereof we affix our signatures.

JAMES M. WRAY.
VINTON P. WRAY.